(12) United States Patent
Gill

(10) Patent No.: US 7,423,392 B2
(45) Date of Patent: Sep. 9, 2008

(54) SPEED CONTROL FOR AN ELECTRIC LINEAR ACTUATOR SUCH AS A TRAILER JACK AND THE LIKE

(75) Inventor: George Patrick Gill, Caledonia, IL (US)

(73) Assignee: Atwood Mobile Products LLC, Elkhart, IN (US)

( * ) Notice: Subject to any disclaimer, the term of this patent is extended or adjusted under 35 U.S.C. 154(b) by 381 days.

(21) Appl. No.: 11/068,634

(22) Filed: Feb. 28, 2005

(65) Prior Publication Data
US 2006/0192507 A1      Aug. 31, 2006

(51) Int. Cl.
*H02P 1/00*      (2006.01)
(52) U.S. Cl. .................. 318/268; 254/418; 254/423; 254/424; 254/425; 318/135
(58) Field of Classification Search .................. 318/114
See application file for complete search history.

(56) References Cited

U.S. PATENT DOCUMENTS 4,307,799 A * 12/1981 Zouzoulas .................. 192/150
6,614,195 B2 * 9/2003 Bushey et al. .............. 318/135
6,695,289 B1 * 2/2004 Mickael ...................... 254/122
2006/0102578 A1 * 5/2006 Zakula et al. ............... 212/283

* cited by examiner

Primary Examiner—Lincoln Donovan
Assistant Examiner—Michael Brandt
(74) Attorney, Agent, or Firm—Porter, Wright, Morris & Arthur, LLP

(57) ABSTRACT

A trailer jack system includes an electric linear actuator having an electric motor, a source of electric power, and a controller that supplies a first voltage to the electric motor when the electric linear actuator is loaded and a second voltage to the electric motor when the electric linear actuator is unloaded. The electric linear actuator also includes a cylindrically shaped housing, a leg coaxially extending and retracting from the housing, and a support foot at a free end of the leg. The controller supplies the first voltage to the electric motor when a motor current of the electric motor is below a predetermined threshold value and supplies the second voltage to the electric motor when the motor current is above the predetermined threshold value. Preferably, the first voltage is about 24 volts and the second voltage is about 12 volts.

12 Claims, 4 Drawing Sheets

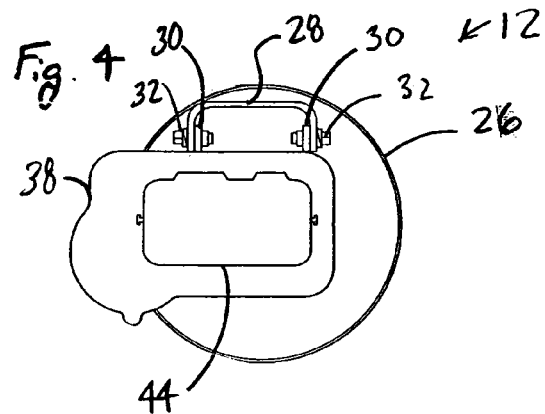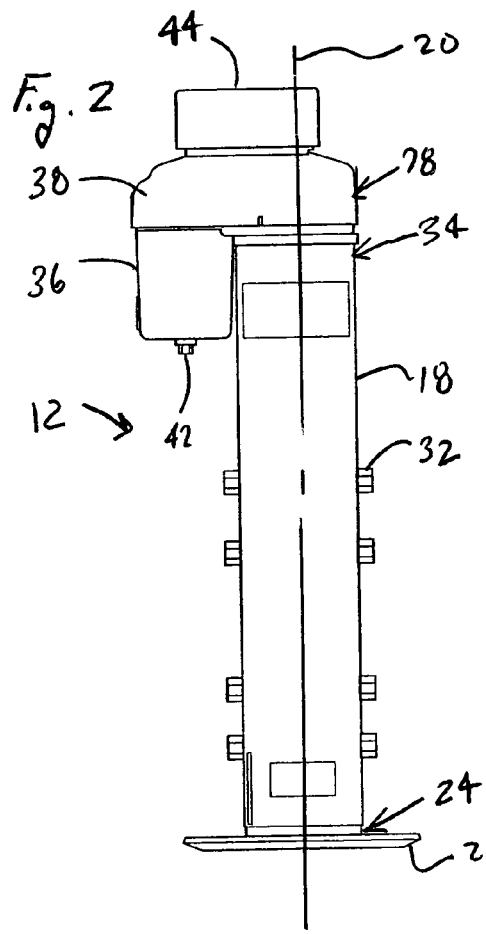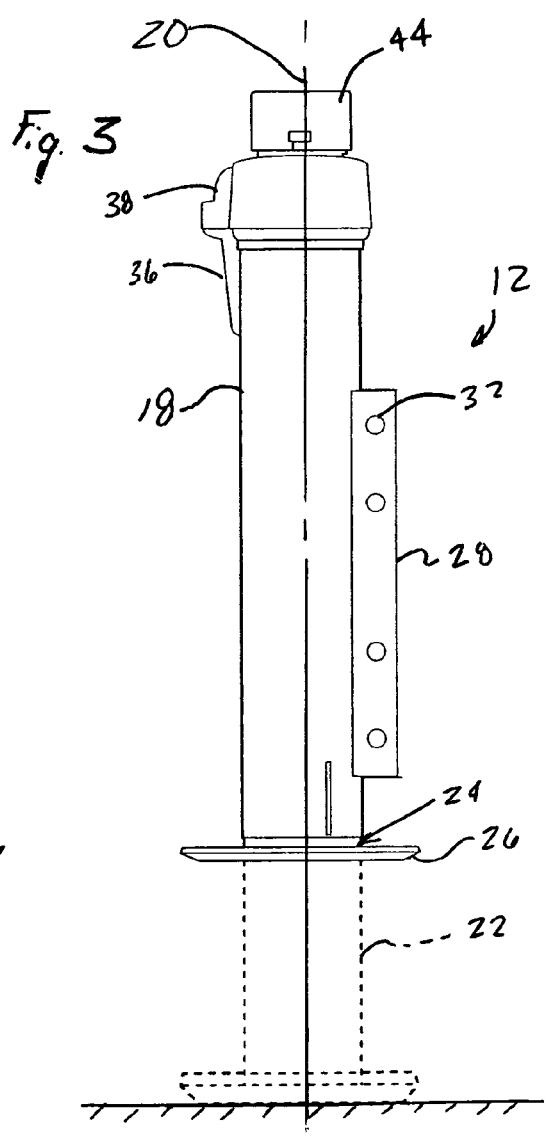

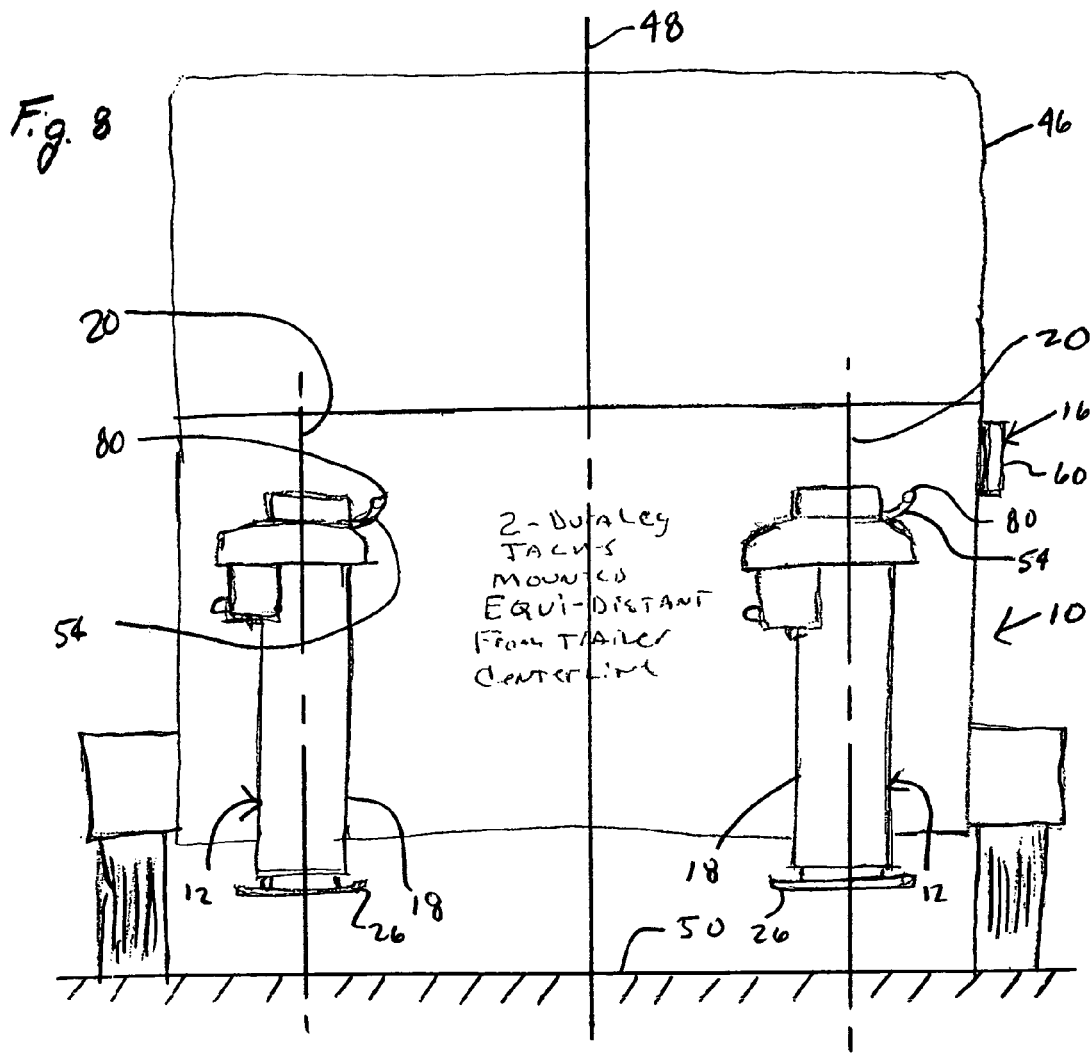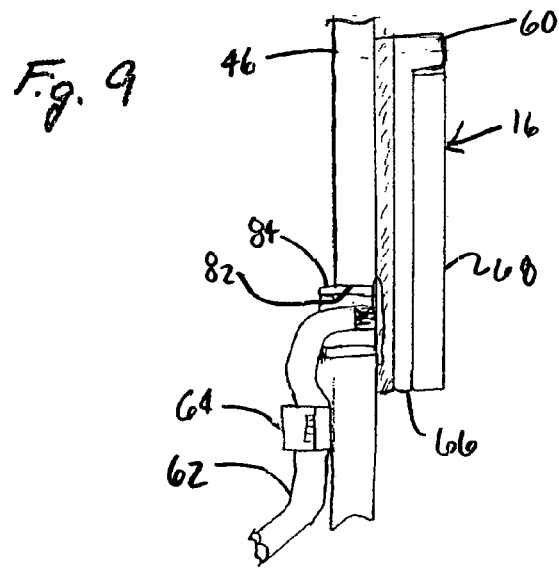

SPEED CONTROL FOR AN ELECTRIC LINEAR ACTUATOR SUCH AS A TRAILER JACK AND THE LIKE

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to linear actuator systems and, more particularly, to electric linear actuator systems such as trailer jacks or the like.

BACKGROUND OF THE INVENTION

Trailers such as, for example, horse trailers and other cargo trailers, and campers and other recreational vehicle trailers, can be attached to a towing vehicle by a ball and socket hitch, gooseneck coupler, fifth wheel coupler, or other coupling means. Particularly with fifth wheel couplers, it is necessary to raise the front end of the trailer to a sufficient height to permit the towing vehicle to back under the kingpin in order to couple the fifth wheel. The front end of the trailer is usually raised by means of jacks that can be powered hydraulically, pneumatically, or electrically. Typically, operation of the jack is controlled by an electric switch mounted on the trailer.

Trailer jacks typically have a drop leg so that they quickly engage the ground and are ready for lifting the trailer. Some trailer jacks, however, cannot be adapted to include drop legs. This is particularly true of trailer jacks having electrically linear actuators housed in cylindrically-shaped housings. These trailer jacks must be electrically actuated to first engage the ground and then to lift the trailer. This can result in an undesirably long period of time to lift the trailer because the time to engage the ground often exceeds the time to lift the trailer. Accordingly, there is a need in the art for an improved electric linear actuator system.

SUMMARY OF THE INVENTION

The present invention provides a trailer brake system which overcomes at least some of the above-noted problems of the related art. According to the present invention, an electric linear actuator system includes, in combination, an electric linear actuator having an electric motor, a source of electric power operably connected to the electric motor, and a controller operably connecting the electric motor and the source of electric power so that a first voltage is supplied to the electric motor when the electric linear actuator is loaded and a second voltage is supplied to the electric motor when the electric linear actuator is unloaded. The first voltage is greater than the second voltage.

According to another aspect of the present invention, a trailer jack system includes, in combination, an electric linear actuator having an electric motor, a source of electric power operably connected to the electric motor, and a controller operably connecting the electric motor and the source of electric power so that a first voltage is supplied to the electric motor when the electric linear actuator is loaded and a second voltage is supplied to the electric motor when the electric linear actuator is unloaded. The first voltage is greater than the second voltage.

According to yet another aspect of the present invention, a trailer jack system includes, in combination, an electric linear actuator having an electric motor, a source of electric power operably connected to the electric motor, and a controller operably connecting the electric motor and the source of electric power so that a first voltage is supplied to the electric motor when the electric linear actuator is loaded and a second voltage is supplied to the electric motor when the electric linear actuator is unloaded. The electric linear actuator includes a cylindrically shaped housing, a leg coaxially extending and retracting from the housing, and a support foot at a free end of the leg. The controller supplies the first voltage to the electric motor when a motor current of the electric motor is below a predetermined threshold value and supplies the second voltage to the electric motor when the motor current is above the predetermined threshold value. The first voltage is about 24 volts and the second voltage is about 12 volts.

From the foregoing disclosure and the following more detailed description of various preferred embodiments it will be apparent to those skilled in the art that the present invention provides a significant advance in the technology and art of electric linear actuator systems and methods. Particularly significant in this regard is the potential the invention affords for providing a high quality, reliable, fast operating assembly. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein:

FIG. 2 is a front elevational view of a trailer jack the trailer jack system of FIG. 1;

FIG. 3 is a left side elevational view of the trailer jack of FIG. 2;

FIG. 4 is a top plan view showing of the trailer jack of FIGS. 2 and 3;

FIG. 8 is a front elevational view of a trailer having a trailer jack system with a pair of trailer jacks according tot eh present invention; and FIG. 9 is a cross-sectional view showing attachment of an operator input or control box of the trailer jack system of FIG. 9.

Figure 1:
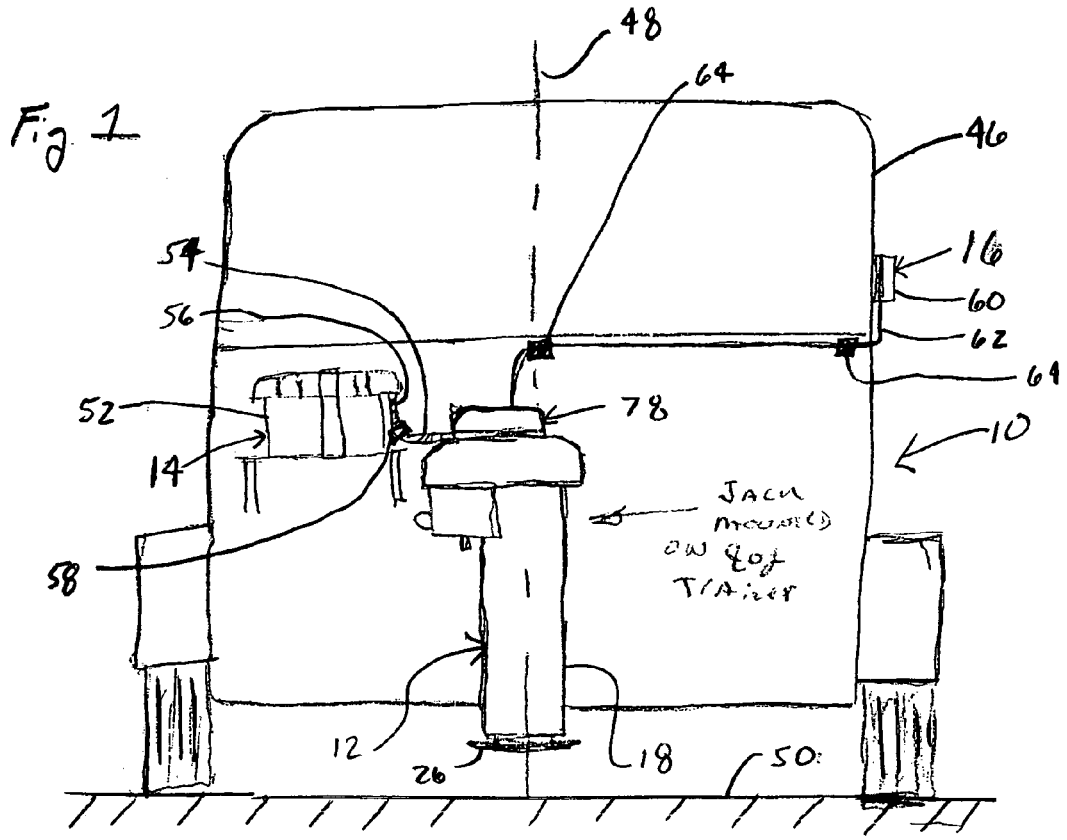
FIG. 1 is a front elevational view of a trailer having a trailer jack system according to a preferred embodiment of the present invention.

It should be understood that the appended drawings are not necessarily to scale, presenting a somewhat simplified representation of various preferred features illustrative of the basic principles of the invention. The specific design features of an electric linear actuator system as disclosed herein, including, for example, specific dimensions, orientations, locations, and shapes will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the electric linear actuator system illustrated in the drawings. In general, up or upward refers to an upward direction within the plane of the paper in FIG. 1 and down or downward refers to a downward direction within the plane of the paper in FIG. 1. Also in general, fore or forward refers to a direction toward the front of the tow vehicle and trailer, that is, to the left within the plane of the paper in FIG. 1 and aft or rearward refers to a direction toward the rear of the tow vehicle and trailer, that is, to the right within the plane of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved electric linear actuator system and method disclosed herein. The following detailed discussion of various alternative and preferred embodiments will illustrate the general principles of the invention with reference to a trailer jack. Other embodiments suitable for other applications will be apparent to those skilled in the art given the benefit of this disclosure.

Referring now to the drawings, FIG. 1 shows an electric linear actuator or trailer jack system 10 according to a preferred embodiment of the present invention. The trailer jack system 12 includes an electric actuator or trailer jack 14, a source of electric power 16, and a controller or control system 18.

As best shown in FIGS. 2 to 4, the illustrated trailer jack 14 includes a cylindrically shaped main housing 18 comprising a tube and forming vertical centerline 20 for the trailer jack 18. A ram or leg 22 of a ram and screw assembly 24 coaxially moves in telescopic relationship with the main housing 20 a over a range of travel between a retracted or home position (best shown in solid line in FIG. 3) and an extended or engaging position (best shown in dashed line in FIG. 3). The total distance the leg 22 extends, that is, the total range of travel or stroke, can be any desired distance such as, for example, about 20 inches. The lower or free end of the leg 22 is provided with a foot 26 sized and shaped for engaging and supporting the trailer jack 12 on the ground. The illustrated foot 26 is circular having a diameter greater than the cylindrical-shaped main housing 18 but the foot 26 can alternatively have any other suitable size and/or shape. The illustrated trailer jack 12 includes a mounting bracket 28 in the form of a vertically extending channel fastened to flanges 30 of the main housing 18 with a plurality of bolts 32 but the mounting bracket 28 can alternatively be secured in any other suitable manner. The flanges 30 are preferably welded to the main housing 18 but any other suitable method of attachment can alternatively be utilized.

The ram and screw assembly 24 is preferably driven by an electric motor 34 connected by a suitable gear box 36. The illustrated gear box 36 is located adjacent the top of the main housing 18 and the top of the main housing 18 and the gear box 36 are covered by a gearbox cover 40. The lower end of the gear box 36 is provided with a manual override device 42 which can be utilized by the operator to manually extend and retract the leg 22 upon the loss of power and the like. The illustrated manual override device 42 is adapted to cooperate with a standard socket drive, wrench or the like. Located above the gear box cover 40 is a control box cover 44 which encloses various electrical connections and a portion of the controller 16 as described in more detail hereinafter As best shown in FIG. 1, the mounting bracket 28 is secured to the forward end of a trailer 46 so that the trailer jack 12 is vertically oriented with the foot 26 facing downward and the centerline 20 of the trailer jack is aligned with the lateral centerline 48 of the trailer 46. The trailer jack 12 is vertically oriented so that the foot 26 is spaced above the ground 50 a desired distance when the leg 22 is in its retracted position and the foot 26 engages the ground 50 when the leg 22 is a desired distance away from its fully extended position as described in more detail hereinafter. The illustrated trailer jack 12 is positioned so that the unloaded or free travel portion of its stroke, the portion of the stroke before the foot 26 engages the ground 50, is about 14 inches and the loaded or work travel portion of the stroke is about 6 inches. It is noted that other applications can have other suitable free travel to work travel ratios and/or distances within the scope of the present invention.

The illustrated source of electric power 14 is a DC battery 52 mounted to the forward end of the trailer 46. Power and ground leads 54 are routed between the battery 52 and the control box 44 along the exterior of the trailer 46 to suitably connect the battery 52 and the electric motor 34. A suitable resetable breaker 56 is preferably located along the power lead 54 near the battery 52 such as, for example, a 40 amp manually resetable breaker. The leads 54 are preferably secured to the trailer 46 between the battery 52 and the control box 44 in a suitable manner such as, for example, by rose bud clamps 58. It is noted that the source of electric power 14 can alternatively be any other suitable type of power source and/or can alternatively have any other suitable location.

The illustrated controller 16 includes an operator input or switch box 60 from which an operator can input desired control signals to operate the trailer jack system 10. The illustrated switch box 60 is positioned on a driver's side exterior surface of the trailer 46 so that it is remote from the trailer jack 12. A switch cable 62 is routed between the battery and the control box along the exterior of the trailer to suitably connect the battery 52 and the electric motor 34. The switch cable 62 is preferably secured to the trailer 46 between the control box 44 and the switch box 60 in a suitable manner such as, for example, by cable clamps 64. It is noted that the switch box 60 can alternatively have any other suitable location and/or can be connected in any other suitable manner.

Figure 5:
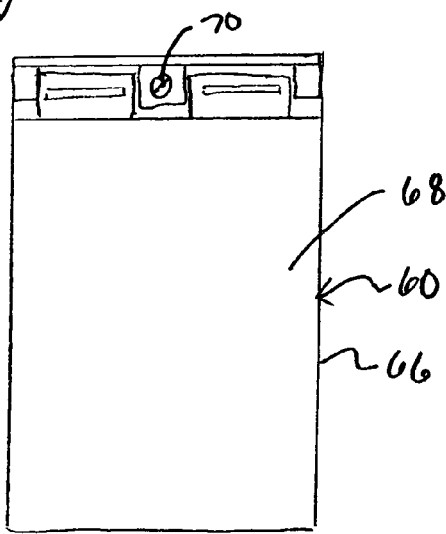
FIG. 5 is an elevational view of an operator input or control box of the trailer jack system of FIG. 1.
Figure 6:
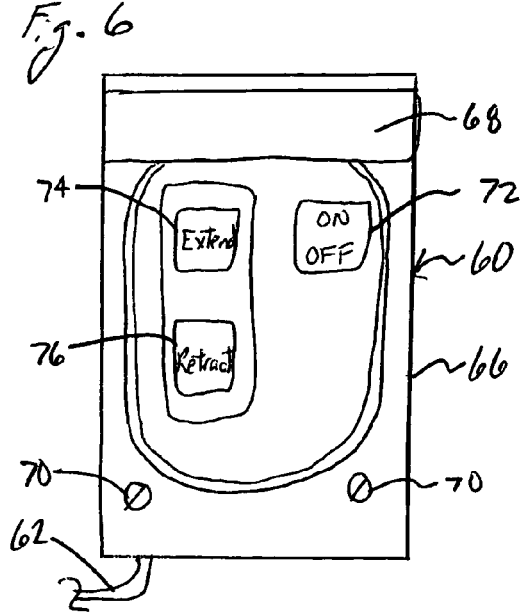
FIG. 6 is an elevational view similar to FIG. 5 but with an access door of the operator input or control box pivoted to an open position.

As best shown in FIGS. 5 and 6, the illustrated switch box 60 has main body 66 and a front cover 68 pivotably attached to the upper portion of the main body 66. The main body 66 is preferably secured to the trailer 46 by a plurality of mechanical fasteners 70. When the front cover 68 is pivoted upward, the operator has access to a plurality of input switches 72, 74, 76 to provide control signals for desired operation of the trailer jack 12. The illustrated switch box 60 includes an on/off switch 72, an extend switch 74, and a retract switch 76. The input switches 72, 74, 76 can be of any suitable type. It is noted that any other desired quantity and/or type of input switches or other operator input means 72, 74, 76 can be utilized.

The controller 16 is adapted to optimize power usage by adjusting speed of the electric motor 34 depending on the power demand or load as the trailer jack 12 moves over its total range of travel or stroke. When the trailer jack 12 is operating under lower power demand, such as no or low load conditions, the controller 16 steps up the motor voltage to increase motor speed and cause the trailer jack 12 to move at a higher rate of speed. Increasing the motor voltage at this point (low current draw) in the load demand curve takes advantage of the stored power potential in the battery 52 or other limited source of electric power. As the power demand or load increases, the controller 16 automatically decreases the motor voltage either by step function or analog rationing to limit the current draw. Thus, the voltage to the motor is increased during the unloaded or free travel portion of the total stroke but not during the loaded or work travel portion of the total stroke. The resulting speed adjustment greatly increases the speed to ground of the system 10, particularly in applications where the free travel portion of the stroke is greater than the work travel portion of the stroke. The illustrated embodiment has ratio of free travel portion is about 70% of the total stroke (14" of 20") resulting in a speed to ground increase of about 50% when the motor voltage is doubled during the free travel portion. It is noted that this speed to ground increase is obtained without increasing the fully loaded motor current and without shifting up the overall power consumption as is the result when the motor speed is increased over the total stroke. This speed adjustment alone or in combination with other electronic functionality such as switching, voltage limiting, power or current limiting, position or load sensing or limiting, operator interfacing etc. eliminates the need for a multi-speed gear box or other variable speed drive.

The controller 16 also includes means 78 for determining the load condition of the trailer jack 12, that is, whether the trailer jack 12 is in the unloaded or free travel portion of the stroke or the loaded or work travel portion of the stroke. The illustrated controller 16 includes a motor current indicator such as, for example, a sensor or other suitable device for indicating motor current draw to determine whether the trailer jack is under load or not. A first voltage is provided to the electric motor 34 when the motor current draw is at or below a threshold current value indicating the trailer jack 12 is not under load and a second voltage is provided to the electric motor 34 when the motor current draw is above the threshold current value indicating that the trailer jack 12 is under load. The first voltage is greater than the second voltage and preferably is twice the second voltage. The illustrated trailer jack has a first voltage of 24 volts and a second voltage of 12 volts but any other suitable voltages can be utilized. The threshold current value can be any suitable current depending on the application such as, for example 4 amps. It is noted that any other suitable load determining means can alternatively be utilized such as, for example, power, load, or position sensing devices.

Figure 7:
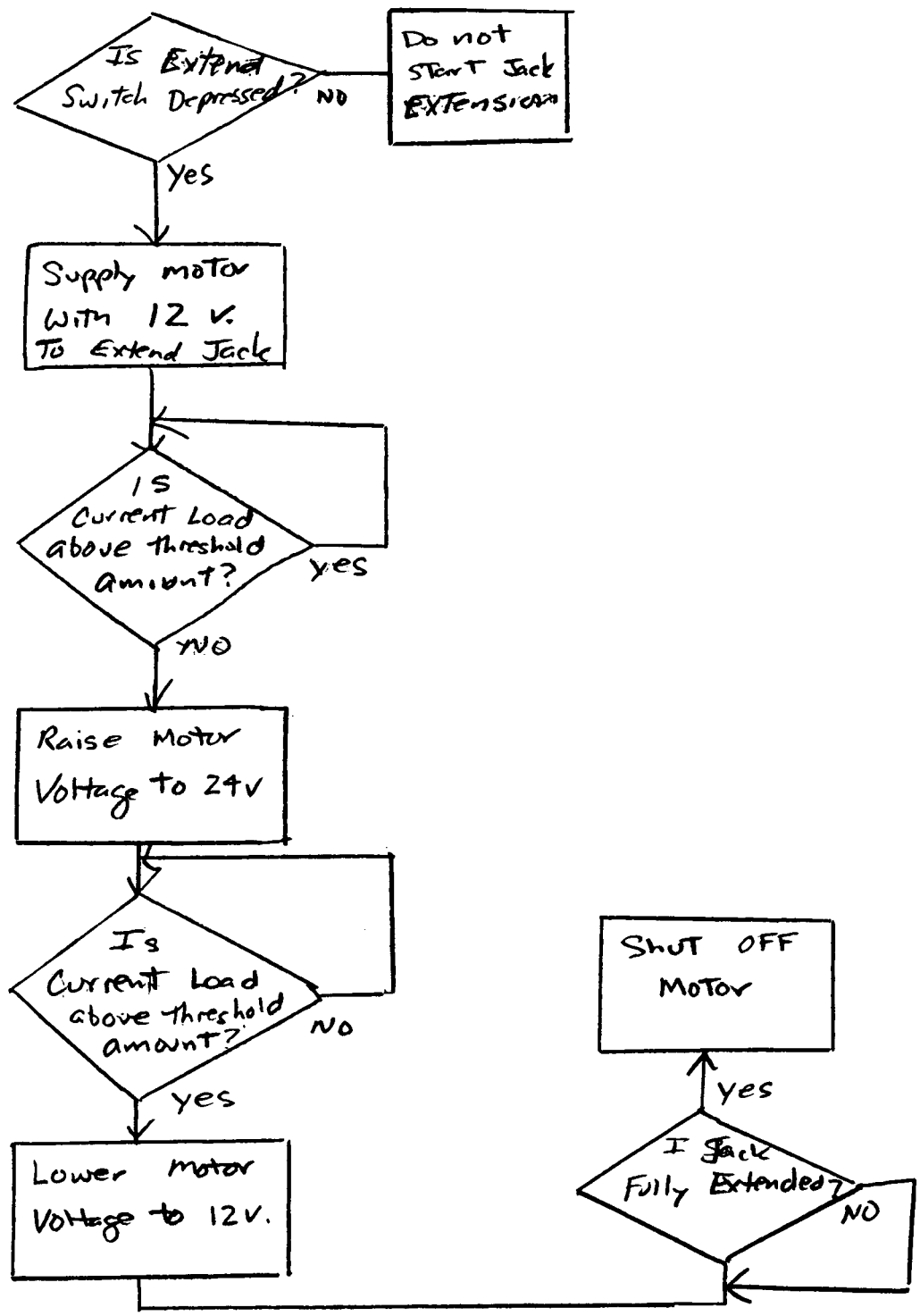
FIG. 7 is a block diagram showing operation of the trailer jack system of FIG. 1.

As best shown in FIG. 7, to operate the lift jack 12 to rise the trailer 46, the operator depresses the on/off switch 72 to power the system 10 and holds down the extend switch 74. The controller 16 determines if the motor current draw is at or below the threshold current value such as, for example, 4 amps. If not, the electric motor 34 continues to be supplied the second voltage such as, for example 12 volts until the controller 16 senses a current draw change. If so, the controller 16 increases the motor voltage to the first voltage such as, for example, 24 volts. Switching relays are preferably used to switch the motor voltage. The increased motor voltage increases the motor speed and the trailer jack 12 more rapidly descends until the controller 16 senses a motor current draw change. When the motor current draw is above the threshold current value, indicating the trailer jack 12 has engaged the ground and is in a loaded condition, the controller 16 decreases the motor voltage to the second voltage to lift the load of the trailer 46. When the trailer jack 12 lifts the trailer 46 to its desired height the operator releases the extend switch 74 and the electric motor 34 stops and the on/off switch 72 is depressed to power down the system 10. However, if the motor current draw is above the threshold current value, indicating the trailer jack 12 has extended to its end of travel, the controller stops the electric motor 34 and powers down the system 10 and the operator can release the extend switch 74.

To lower the trailer 46, the operator depresses the on/off switch 72 to power the system 10 and holds down the retract switch 76. The controller 16 determines if the current draw is at or below the threshold current value such as, for example, 4 amps. If so, the controller 16 increases the motor voltage to the first voltage such as, for example, 24 volts. The increased voltage increases the motor speed and the trailer jack 12 more rapidly retracts until the controller 16 senses a current draw change. If not, the electric motor 34 continues to be supplied the second voltage such as, for example 12 volts until the controller senses a current draw change. When the current draw is at or below the threshold current value, indicating the trailer jack 12 is no longer engaging the ground 50 and/or supporting the trailer 46, the controller 16 increases the motor voltage to the first voltage. The increased voltage increases the motor speed and the trailer jack 12 more rapidly retracts until the controller 16 senses a motor current draw change. When the motor current draw is above the threshold current value, indicating the trailer jack 12 has retracted to its end of travel or home position, the controller 16 stops the electric motor 34 and powers down the system 10 and the operator can release the retract switch 76.

In addition to the above described rapid extend and rapid retract features, the control system 16 is preferably provided with automatic extend automatic retract features. When extending the trailer jack 12, the automatic extend feature enables the operator to depress the extend switch 74 until the rapid extend feature is engaged, or some other predetermined period of time such as, for example, three seconds, and then the operator can release the extend switch 74 and the trailer jack 12 automatically extends to full travel. There is an audible indication when the motor voltage is increased so the operator will know that the extend switch can be released. Preferably, the trailer jack 12 will only permit the automatic extend mode when the trailer jack 12 is in the rapid extend mode. If the operator depresses any switch 72, 74, 76 while the system 10 is in the automatic extend mode, the controller 16 stops the electric motor 34 as an emergency stop. When the trailer jack reaches the ground and is in a loaded condition, the controller stops the electric motor 34 and the operator must continue to depress the extend switch 74 to lift the trailer 46. When retracting the trailer jack 12, the automatic retract feature enables the operator to depress the retract switch 76 until the rapid retract feature is engaged, or some other predetermined period of time such as, for example, three seconds, and then the operator can release the retract switch 76 and the trailer jack 12 automatically retracts to full travel. There is an audible indication when the motor voltage is increased so the operator will know that the retract switch 76 can be released. Preferably, the trailer jack will only permit the automatic retract mode when the trailer jack 12 is in the rapid retract mode. If the operator depresses any switch 72, 74, 76 while the system is in the automatic retract mode, the controller 16 stops the electric motor 34 as an emergency stop. The automatic extend and retract features give the appearance of faster speed to ground and speed to home times because the operator does not have the hold the switch 74, 76 the entire cycle.

FIGS. 8 and 9 show a second embodiment of the present invention wherein common references numbers are utilized to show common structure. The second embodiment of the invention illustrates that the electric trailer jack system 10 can include more than one trailer jack 12, that the source of electric power 14 can be located inside the trailer 46, and the switch cable 62 can be routed within the trailer 46. The illustrated embodiment includes two of the trailer jacks which as laterally spaced apart and equidistant from the centerline 48 of the trailer 46. The battery 52 is located within the trailer 46 so the leads 54 extend through openings 80 in the walls of the trailer 46. The switch cable 62 also extends through openings 80, 82 in the walls of the trailer 46 so that it can be routed between the trailer jacks 12 and the switch box 60 within the trailer 46. The openings 80, 82 are preferably provided with grommets 84 or other means for sealing the opening with a water-tight seal.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications and applications as are suited to the particular use contemplated. All such modifications and variations are within the scope of the present invention as determined by the appended claims when interpreted in accordance with the benefit to which they are fairly, legally, and equitably entitled.

What is claimed is:

1. A trailer jack system for engaging ground to raise and support a trailer, said trailer jack system comprising, in combination:
    an electric linear actuator securable to the trailer and having an electric motor;
    wherein the electric linear actuator includes a vertically extending housing, vertically extending leg coaxially extending and retracting from a bottom of the housing to engage and disengage the ground, and a mounting bracket for securing the housing to the trailer;
    wherein a total travel of the electric linear actuator includes a free travel portion when linear actuator is disengaged from the ground so that the electric linear actuator is unloaded and a work travel portion when the linear actuator is engaged with the ground so that the electric linear actuator is loaded;
    a source of electric power operably connected to the electric motor;
    a controller operably connecting the electric motor and the source of electric power so that a first voltage is automatically supplied to the electric motor when the electric linear actuator is traveling in the free travel portion and a second voltage is automatically supplied to the electric motor when the electric linear actuator is traveling in the work travel portion;
    an operator input switch which can be released while the electric linear actuator is traveling in the free travel portion and the electric linear actuator will continue to travel in the free travel portion but the input switch must be continuously depressed while the electric linear actuator is traveling in the work travel portion in order for the electric linear actuator to continue traveling in the work travel portion; and
    wherein the first voltage is greater than the second voltage.

2. The electric linear actuator system according to claim 1, wherein the source of electric power is a battery.

3. The trailer jack system according to claim 1, wherein the first voltage is about twice the second voltage.

4. The trailer jack system according to claim 3, wherein the first voltage is about 24 volts and the second voltage is about 12 volts.

5. The trailer jack system according to claim 1, wherein the controller supplies the first voltage to the electric motor when a motor current of the electric motor is below a predetermined threshold value.

6. The trailer jack system according to claim 5, wherein the controller supplies the second voltage to the electric motor when the motor current of the electric motor is above the predetermined threshold value.

7. The trailer jack system according to claim 1, wherein the controller supplies the second voltage to the electric motor when a motor current of the electric motor is above a predetermined threshold value.

8. The trailer jack system according to claim 1, wherein the controller includes means for determining whether the electric linear actuator unloaded.

9. The trailer jack system according to claim 8, wherein the determining means includes a motor current indicator.

10. The trailer jack system according to claim 1, wherein the housing is cylindrically shaped.

11. A trailer jack system for engaging ground to raise and support a trailer, said trailer jack system comprising, in combination:
    an electric linear actuator securable to the trailer and having an electric motor;
    wherein the electric linear actuator includes a vertically extending, cylindrically shaped housing, a leg coaxially extending and retracting from a bottom of the housing, a mounting bracket for securing the housing to the trailer, and a support foot at a free lower end of the leg;
    a source of electric power operably connected to the electric motor;
    wherein a total travel of the electric linear actuator includes a free travel portion when the support foot is disengaged from the ground so that the electric linear actuator is unloaded and a work travel portion when the support foot is engaged with the ground so that the electric linear actuator is loaded;
    a controller operably connecting the electric motor and the source of electric power so that a first voltage is automatically supplied to the electric motor when the electric linear actuator is traveling in the free travel portion and a second voltage is automatically supplied to the electric motor when the electric linear actuator is traveling in the work travel portion;
    an operator input switch which can be released while the electric linear actuator is traveling in the free travel portion and the electric linear actuator will continue to travel in the free travel portion but the input switch must be continuously depressed while the electric linear actuator is traveling in the work travel portion in order for the electric linear actuator to continue traveling in the work travel portion;
    wherein the controller supplies the first voltage to the electric motor when a motor current of the electric motor is below a predetermined threshold value and supplies the second voltage to the electric motor when the motor current is above the predetermined threshold value; and
    wherein the first voltage is about 24 volts and the second voltage is about 12 volts.

12. The trailer jack system according to claim 1, wherein the electric linear actuator includes a support foot at a free lower end of the leg.

* * * * *